(12) United States Patent
Hoerter

(10) Patent No.: US 10,966,432 B2
(45) Date of Patent: Apr. 6, 2021

(54) PROCESS AND APPARATUS FOR COOKING UTILIZING NEBULIZED WATER PARTICLES AND AIR

(71) Applicant: AHA, LLC, Bloomfield, IN (US)

(72) Inventor: Robert Hoerter, Bloomfield, IN (US)

(73) Assignee: AHA, LLC, Bloomfield, IN (US)

( * ) Notice: Subject to any disclaimer, the term of this patent is extended or adjusted under 35 U.S.C. 154(b) by 100 days.

(21) Appl. No.: 16/367,854

(22) Filed: Mar. 28, 2019

(65) Prior Publication Data

US 2020/0138043 A1 May 7, 2020

Related U.S. Application Data

(60) Provisional application No. 62/649,677, filed on Mar. 29, 2018.

(51) Int. Cl.

| A21B 1/36 | (2006.01) |
| A21B 1/26 | (2006.01) |
| A23L 5/10 | (2016.01) |
| A47J 37/01 | (2006.01) |
| A21B 3/04 | (2006.01) |
| F24C 13/00 | (2006.01) |
| F24C 15/00 | (2006.01) |
| F24C 15/32 | (2006.01) |

(52) U.S. Cl.
CPC ............. *A21B 1/36* (2013.01); *A21B 1/26* (2013.01); *A21B 3/04* (2013.01); *A23L 5/13* (2016.08); *A47J 37/01* (2013.01); *F24C 13/00* (2013.01); *F24C 15/003* (2013.01); *F24C 15/327* (2013.01)

(58) Field of Classification Search
CPC ...... F24C 15/003; F24C 13/00; F24C 15/327; A21B 3/04; A47J 27/04; A47J 2027/043
See application file for complete search history.

(56) References Cited

U.S. PATENT DOCUMENTS 2,141,591 A 12/1938 Herbert
2,931,882 A 4/1960 Strauss
(Continued)

OTHER PUBLICATIONS

Invitation to pay additional fees, and, where applicable, protest and provisional opinion accompanying the partial search result issued by the International Searching Authority dated Jun. 16, 2020 with respect to PCT/US2020/023118 in relation to U.S. Appl. No. 16/367,854.
(Continued)

*Primary Examiner* — David J Laux
(74) *Attorney, Agent, or Firm* — Scott R. Cox; Jessica C. Lindner

(57) ABSTRACT

A process and apparatus for heating an oven using nebulized water particles and compressed air including the steps of heating water contained in reservoir that is located outside of a cooking chamber by transferring water within the reservoir through a water heater to reach a desired end point temperature that is less than boiling, heating compressed air by sending compressed air through an air heater that is submerged within the water of the reservoir, conveying the heated water and the heated compressed air to a nebulizer, nebulizing the heated water into heated water particles and introducing the heated water particles into the cooking chamber via the heated compressed air.

20 Claims, 10 Drawing Sheets

(56) References Cited

U.S. PATENT DOCUMENTS

| | | | | |
|---|---|---|---|---|
| 4,700,685 A | * | 10/1987 | Miller | A21B 3/04 |
| | | | | 126/20 |
| 4,906,485 A | | 3/1990 | Kirchhoff | |
| 5,494,690 A | * | 2/1996 | Shelton | A21B 1/40 |
| | | | | 426/233 |
| 5,530,223 A | * | 6/1996 | Culzoni | A21B 3/04 |
| | | | | 126/20 |
| 5,619,983 A | * | 4/1997 | Smith | A47J 27/16 |
| | | | | 126/20 |
| 6,188,045 B1 | * | 2/2001 | Hansen | F22B 27/16 |
| | | | | 126/20 |
| 7,304,278 B2 | * | 12/2007 | Kanzaki | F24C 15/327 |
| | | | | 219/403 |
| 7,867,534 B2 | * | 1/2011 | Sells | A23L 5/13 |
| | | | | 426/233 |
| 7,989,737 B2 | * | 8/2011 | Jeon | A47J 27/04 |
| | | | | 219/401 |
| 8,704,138 B2 | | 4/2014 | Sells et al. | |
| 8,993,934 B2 | * | 3/2015 | Giazzon | F24C 15/327 |
| | | | | 219/400 |
| 2008/0078371 A1 | * | 4/2008 | Boscaino | F24C 14/005 |
| | | | | 126/20 |
| 2008/0223353 A1 | | 9/2008 | Cristiani | |
| 2013/0259455 A1 | * | 10/2013 | Schootstra | F22B 1/287 |
| | | | | 392/394 |
| 2013/0264327 A1 | * | 10/2013 | Kao | F24C 13/00 |
| | | | | 219/401 |
| 2017/0082301 A1 | * | 3/2017 | Tommasin | F24C 15/2007 |
| 2019/0086143 A1 | | 3/2019 | Liss et al. | |
| 2020/0329909 A1 | * | 10/2020 | Conrad | A47J 37/0641 |

OTHER PUBLICATIONS

Myhrvold, Nathan et al: "Nathan Myhrvold's Recipe for a Better Oven", Jun. 30, 2014, located at https://spectrum.ieee.org/consumer-electronics/gadgets/nathan-myhrvolds-recipe-for-a-better-oven.

* cited by examiner

PROCESS AND APPARATUS FOR COOKING UTILIZING NEBULIZED WATER PARTICLES AND AIR

CROSS-REFERENCE TO RELATED APPLICATION

This Application claims benefit of Provisional Application No. 62/649,677, filed on Mar. 29, 2018.

FIELD OF THE INVENTION

The field of ovens, and more particularly, to an oven utilizing nebulized water particles and air to cook food at a desired end temperature

BACKGROUND

Numerous preparation devices and procedures are known for the preparation of foods including several types of ovens and similar equipment. One example of a known preparation device is a dry heat oven, as disclosed in U.S. Pat. No. 2,931,882. Although commonly used, there are many problems associated with the use of dry heat ovens. For example, the cooked food usually has a deteriorated appearance, loss of nutritional elements and vitamins, and substantial shrinkage due to the significant loss of water content that occurs with heating the food with dry heat. Accordingly, dry heat ovens are not efficient because excess heat is needed to compensate for the necessary and substantial loss of moisture from the food.

Another well-known food preparation device and procedure includes water vapor ovens, as shown in U.S. Pat. No. 5,494,690. However, there are also many problems associated with the use of water vapor ovens. For example, the large volume of water used during the cooking cycle often becomes contaminated with albumin, fat and other effluents that exude from the food as it is cooked. As a result, a large volume of contaminated water must be drained from the bottom of the unit.

A further, additional food preparation device and procedure includes an automated steam generating system that introduces steam into the cooking cavity of the oven, such as disclosed in U.S. Pat. Nos. 8,704,138 and 7,867,534. However, there are drawbacks with steam ovens. For example, these ovens create a "sweat" due to the condensation of the steam meeting the cooler surfaces of the interior oven walls. This "sweat" often collects, pools and runs over the sides of cooking pans, resulting in a hard to clean food film on the oven's interior surface. Furthermore, the high steam temperatures have a greatly deleterious effect on the nutritional value of foods cooked and are inherently dangerous as scalding and burning is necessarily imparted upon the users by water vapor heated above 212 degrees Fahrenheit.

The inventors have discovered a solution to the problems associated with previous oven systems by inventing an oven that harnesses the precision generation of water vapor and high velocity air. The inventors have discovered a process that uses a surprisingly small amount of water to cook the food, so the delivery of water vapor is more precise, and the oven is more energy efficient. Accordingly, the inventors have discovered a process of cooking food that does not create "drips" or "puddles" of water on the oven walls or floor due to the condensation of excess steam. Further, the inventors have discovered a way to utilize water vapor that is held at a temperature below 212 degrees Fahrenheit, so the oven is safer, more user friendly, and the food retains its taste and nutritional value.

SUMMARY OF INVENTION

One embodiment includes a process for heating an oven, that complies with all U.S. FDA food safety guidelines, wherein the process includes heating water that is contained in a reservoir located outside of a cooking chamber of the oven to reach a desired end point temperature that is less than boiling, heating compressed air through an air heater that is submerged within the water of the reservoir, conveying the heated water and the heated compressed air to a nebulizer, nebulizing the heated water into heated water particles, and introducing the heated water particles into the cooking chamber via the heated compressed air.

This embodiment includes a cooking chamber located within the oven, a nebulizer attached to the cooking chamber, a reservoir of water located outside of the cooking chamber, a reservoir of water located outside of the cooking chamber, wherein the reservoir of water comprises an air heater submerged within the water of the reservoir, wherein the air heater comprises a first end that connects to an air compressor and a second end that connects to the nebulizer, a first water heater comprising a first and second ends thereof, wherein the first and second ends of the first water heater are submerged within the water of the reservoir, and a pipeline comprising a pump, wherein one end of the pipeline is submerged within the water of the reservoir and an opposite end of the pipeline connects to the nebulizer.

Another embodiment includes a process of chilling or refrigerating an oven, wherein the method includes chilling water contained in a reservoir that is located outside of a cooking chamber of the oven to reach a desired end point temperature that is between about 30 degrees Fahrenheit and 50 degrees Fahrenheit, chilling compressed air through an air chiller that is submerged within the water of the reservoir, conveying the chilled water and the chilled compressed air to a nebulizer, nebulizing the chilled water into chilled water particles, and introducing the chilled water particles into the cooking chamber via the chilled compressed air.

DETAILED DESCRIPTION OF ONE EMBODIMENT OF THE INVENTION

Figure 1:
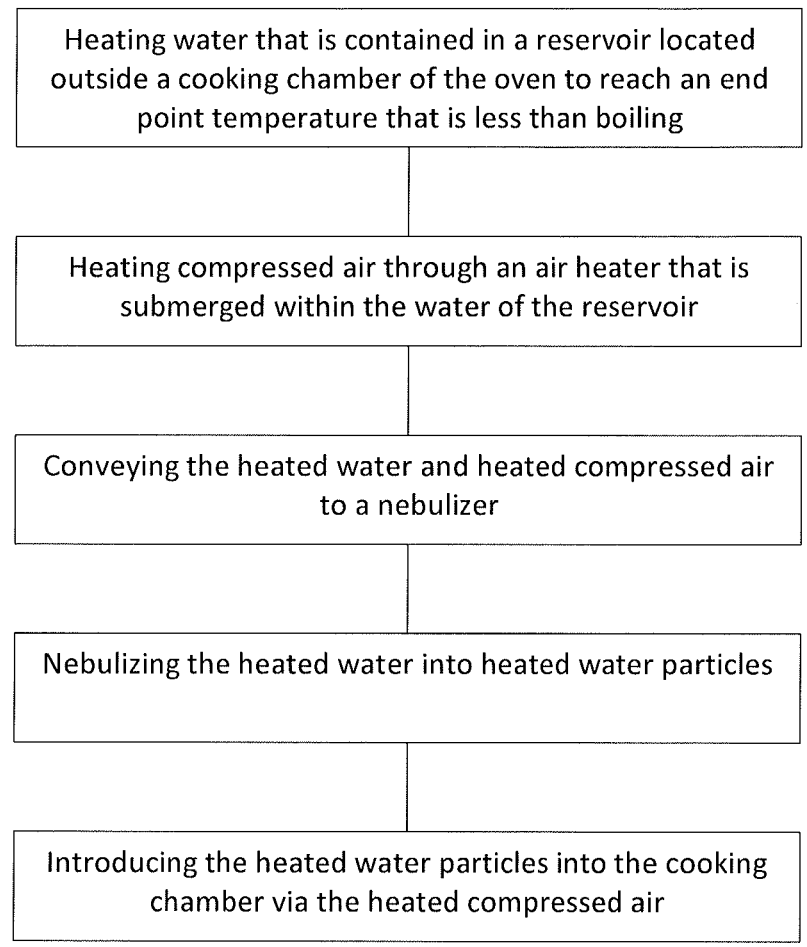
FIG. 1 is a schematic diagram of a process of heating an oven for cooking using nebulized water particles and compressed air.
Figure 2:
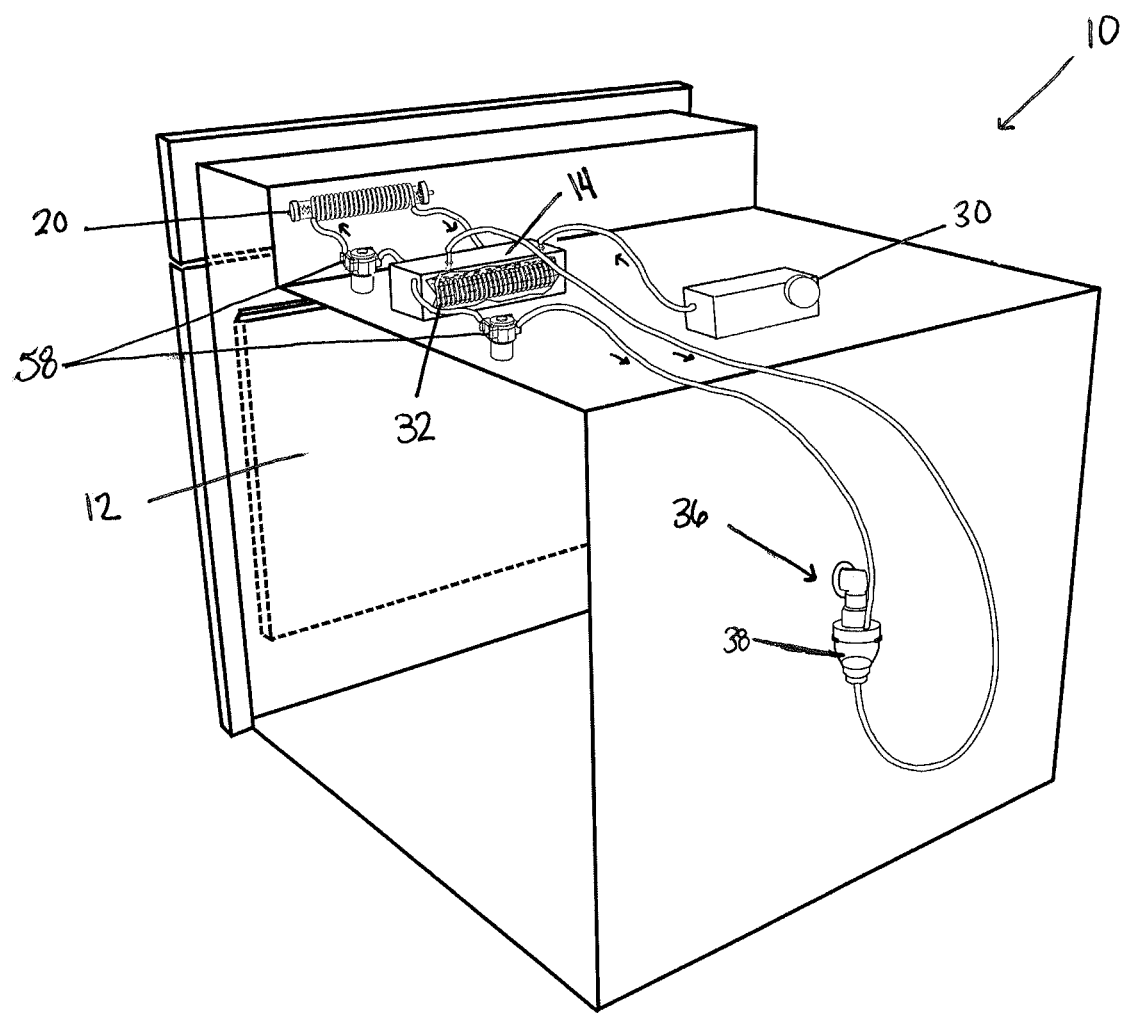
FIG. 2 shows an oven for cooking using nebulized water particles including a reservoir of water with an air heater coil submerged therein, a water heater coil, an air compressor, and a nebulizer.

FIG. 1 is a schematic diagram of one embodiment of a process of heating an oven (10) for cooking using nebulized water particles and compressed air, as shown in FIG. 2. In this embodiment the method includes heating a reservoir (14) of water that is located outside of a cooking chamber (12), as shown in FIG. 2. The reservoir of water is heated by pumping water that is present within the reservoir out of the reservoir and through a water heater coil (20). The pumps utilized to pump water throughout the oven system can be any form of water pump, preferably a peristaltic pump as these pumps are known to be small, precise and simple. Additionally, when a peristaltic pump is switched off, the pump acts as a closed valve, eliminating cross contamination and back pressure. Further, these water pumps move the unpressurized water to and/or from the heaters, reservoir(s), nebulizer(s) and condenser circuits. These pumps are arranged throughout the oven system to efficiently pump the water.

In this embodiment, the water heater is a water heater coil (20), as shown in FIGS. 2, 3, 4, 5 and 7 and includes a resistance wire (22), such as a copper wire or coiled nichrome wire, that passes through glass ceramic tubing (24), which resistance wire and glass ceramic tubing are further surrounded by coiled copper tubing (26). Advantageously, the coiled nichrome wire can be precisely calibrated to the exact desired temperature range by controlling both the diameter and total length of the wire.

This process of heating the water is advantageous because the rapid heating of the nichrome wire and glass-ceramic tubing, in combination with the excellent heat conductivity of copper, almost instantaneously heats the small amount of water necessary for the oven to operate. Thus, the water is quickly heated to the desired end temperature resulting in a vastly more efficient oven and cooking process.

A further embodiment of the water heater includes a halogen light bulb to heat the water or a length of a kanthal sheathed in the ceramic glass tubing. The novel arrangement of the water heater coil avoids the use of a "cal-rod" or "cal-rods" to heat large volumes of water, which, as demonstrated by prior art, is too slow and overshoots the target temperature, thus overcooking the food. Further, the oven (10) also has a much faster temperature and vapor recovery rate, for instance, when the oven door is opened because the oven is continuously creating water vapor heated at the desired temperature and continuously introducing this into the cooking chamber under pressure.

The process of heating the water within the reservoir (14) repeats until the water reaches a desired end point temperature that is less than boiling. This desired end point temperature is determined by a user of the oven (10) when he manually enters the desired end temperature or selects a predetermined cooking program. Present within the reservoir of water is a temperature probe (not shown) that senses the temperature of the water within the reservoir and relays this temperature data to a programmable logic device ("PLD"). PLDs are not novel and are well-known in the art as being electronic components used to build digital circuits that monitor, control and alter the oven's temperature. If the temperature within each feature of the oven (10) is not accurate, the individual PLDs can adjust, readjust and fine tune the temperature by a series of thermostatic controllers that monitor and alter the inputs to the respective heater circuits of the oven. For example, the reservoir temperature sensor relays data about the internal temperature within the reservoir to a reservoir PLD. If the temperature is not where it should be, the PLD automatically adjusts the temperature of a water heater coil to ensure the water temperature within the insulated reservoir is the precise temperature necessary to cook the food to the desired end temperature.

The reservoir (14) can be made of any material, but an insulated material is preferable so as to retain the temperature of the water within the reservoir more consistently. For example, the amount of water needed to cook an entire chicken to an internal temperature of 165° F. is eight fluid ounces (240 ml) of water. This advantageously makes the oven (10) more energy efficient as it does not have to continually overcompensate for lost heat in the oven system. Advantageously, the oven can run on a $120v$ relay, rather than a $240v$ relay additionally making the oven much more energy efficient than prior art ovens.

In the first embodiment shown in FIG. 2, after or as the water in the reservoir (14) is recirculating through the water heater coil (20), air is transferred through an air heater coil (32) that is submerged within the water of the reservoir. In this embodiment, the air is piped through the air heater coil, but other embodiments include alternative means of transferring the air, such as a pump. When the water in the reservoir is heated to the desired end point temperature, the air heater coil, which is made of a heat inducting material, such as copper, necessarily heats to the specific desired end temperature of the water in the reservoir. In this embodiment, the air heater comprises a coil, which is beneficial as it heats the air most efficiently when run through the coil. However, the air heater can be any shape or form and made of any material. Accordingly, when air is piped through the air heater coil, the air is heated to the desired end temperature initially selected by a user of the oven.

In this embodiment, the air is initially piped from a compressor (30) that is located outside of the reservoir. Accordingly, compressed air at a preselected velocity is pumped through the air heater coil. The air compressor may, for example, be a piston air compressor which additionally sterilizes the air. A compressed air PLD controls the pressure of the air being pumped from the air compressor, through the air heater coil (32), into the nebulizer (36) and into the cooking chamber (12). The pressure of air required depends on many factors such as the volume of the cooking chamber, the relative size of the water volume being pumped throughout the oven (10) and the orifice size.

In this embodiment, once the water in the reservoir (14) reaches the desired end temperature for cooking, the water is pumped from the reservoir to a nebulizer (36), as shown in FIG. 2. The nebulizer is preferentially located on a backside of the cooking chamber (12). As this system requires so little water to operate, advantageously, the heated water is delivered to the nebulizer nearly instantly with precise temperature control. This is highly important in cooking food and is an advantage over prior art methods and ovens as it allows both fine control and precise, repeatable consistency in cooking the food to the desired temperature. Further, there are many low-temperature cooking techniques and recipes that greatly benefit from the oven (10). For example, proofing doughs and breads, or baking wet pastries and desserts, such as cheesecakes, which are more precisely prepared with the unique combination of heat and water vapor utilized by the oven. Further, the oven can be used in any area whether it be the foodservice industry or for use within a person's home.

Figure 3:
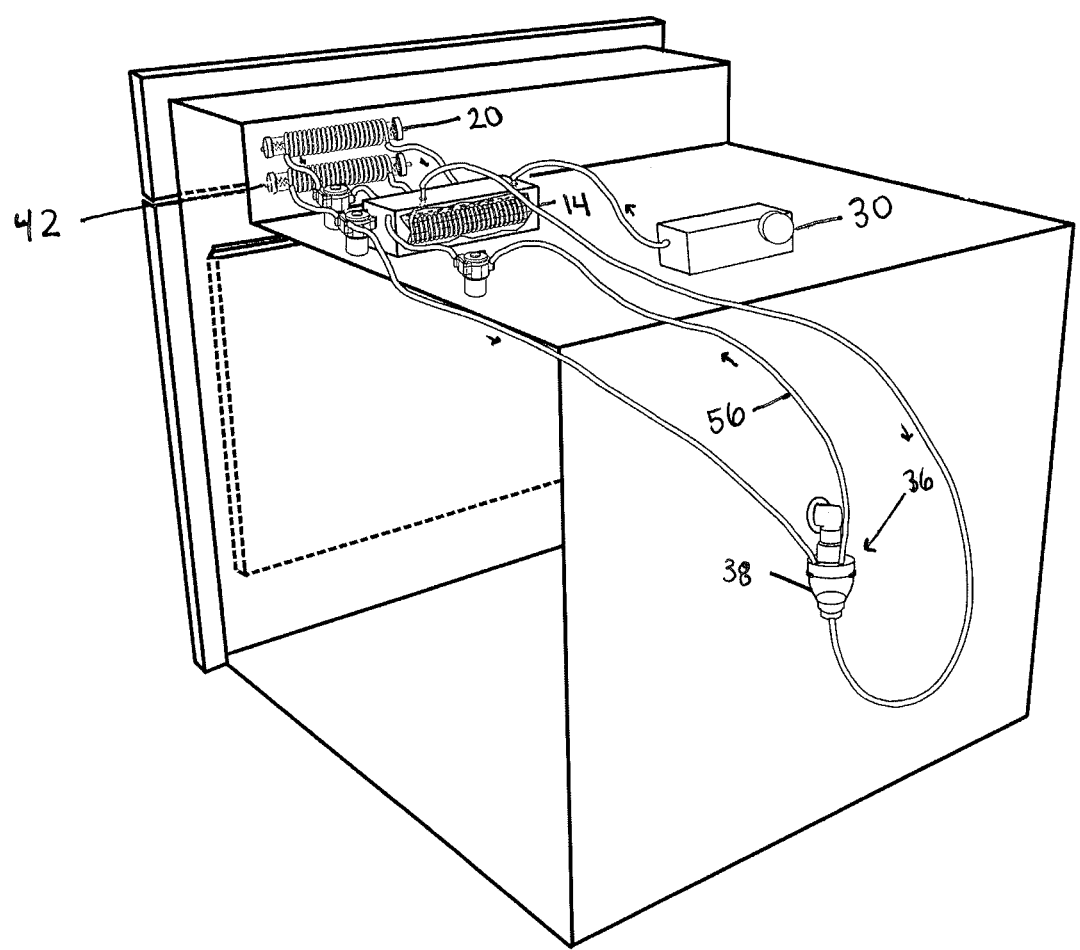
FIG. 3 shows a second embodiment of the oven of FIG. 2 with an additional water heater coil present between the reservoir and nebulizer.

In a second embodiment of the oven (10), as shown in FIG. 3, the heated water from the reservoir (14) is pumped through an additional water heater coil (42) on its way to the nebulizer (36). This additional water heater coil can act as a secondary heat source for the heated water to ensure that the heated water reaches the nebulizer at the desired end temperature. The second water heater coil also ensures that the heated water has not lost its temperature as a result of its movement to the nebulizer (36). The second water heater is used as a "trimming" heater, fine-tuning the temperature of the pre-heated water in the reservoir.

In the first embodiment, as shown in FIG. 2, the heated water is nebulized into heated water particles within the nebulizer (36) using conventional nebulizer techniques. The nebulizer can be any form of nebulizer, such as a Philips Respironics HS 860 SideStream nebulizer, which are disposable and made of a plastic. These nebulizers have a unique five-hole design and a venturi port to create a stream of nebulized particles, 80% of which are less than 5 microns in size However, the nebulizer can be made of any material.

In this embodiment, the air that has been heated to the desired end temperature from the air compressor (30) via the air heater coil (32) is piped to the nebulizer (36), as shown in FIG. 2. The heated water particles are introduced into the cooking chamber (12) of the oven via the heated compressed air that is in the nebulizer. The nebulized water particles cook the food to the desired end temperature and are continually introduced into the cooking chamber (12) via the heated compressed air.

Figure 6:
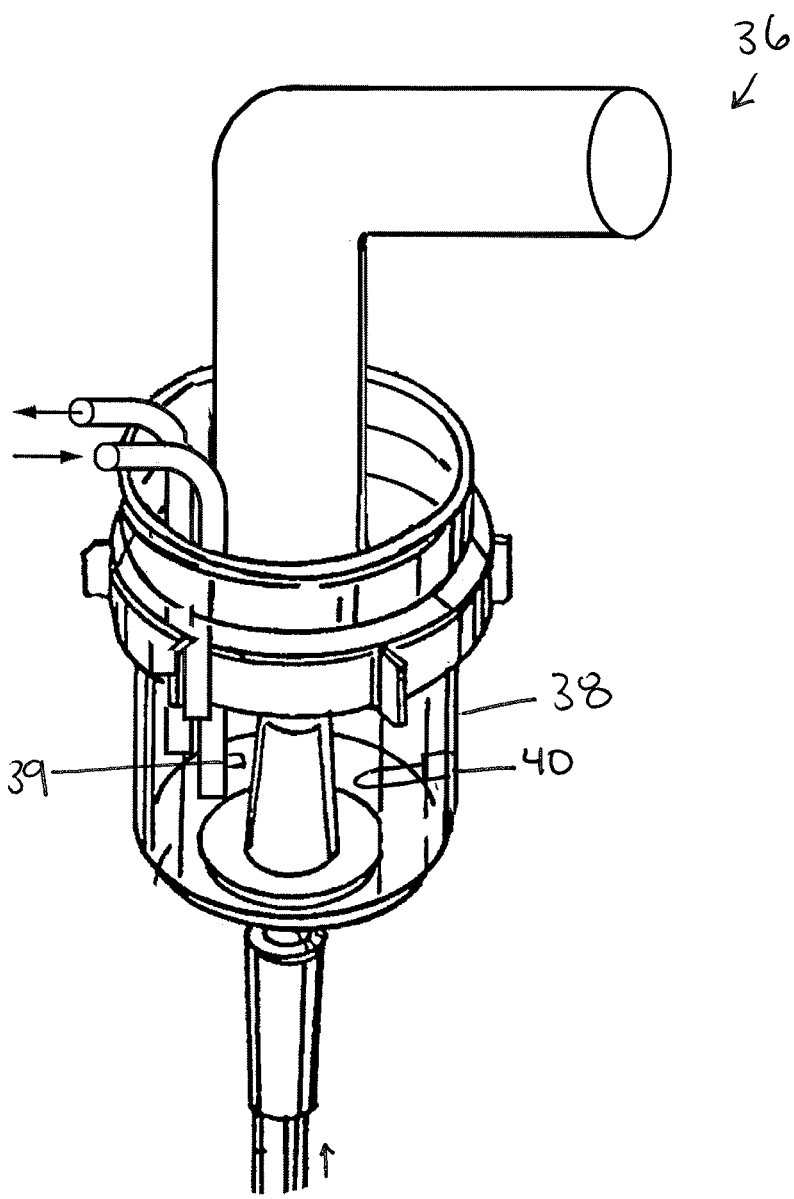
FIG. 6 is a perspective front view of the nebulizer in accordance with the oven of FIG. 2.

A further embodiment of the nebulizer (36) includes a feed bowl (38), as shown in FIG. 6. The feed bowl of nebulizer includes a float switch (40) that detects the level of water within the nebulizer. If the water level rises above a predetermined level, the float switch activates a suction line that draws the excess heated water out of the nebulizer and recirculates this water back to the reservoir (14) for further heating and recirculation throughout the oven. The float switch level of activation is precisely set to ensure correct water delivery level to the nebulizer so as to avoid overfilling. Further, the nebulizer (36) includes a temperature probe (39), as shown in FIG. 6. These temperature probes sense the temperature of the water in the nebulizer. If the temperature is not at the desired end point temperature necessary to cook the food, the oven makes fine-tuned adjustments.

In an alternative embodiment of the oven of FIG. 2, the excess heated water from the nebulizer (36) is pumped through an additional water heater coil (not shown) before it reaches the reservoir. This is advantageous as the excess water that is pumped through a suction line from the nebulizer is heated to the desired end point temperature before reaching the reservoir. This leads to an energy efficient system that does not require excess time to reheat the water as the temperature of the water stays at the desired end point temperature throughout the recirculation process.

In the first embodiment, the cooking chamber (12) of the oven (10), includes a dry-bulb temperature probe (not shown). The dry-bulb temperature probe partially senses the temperature emitted by a radiant heat element (44), such as a nichrome ribbon-wire infra-red broiler plate, that is located within the cooking chamber. The radiant heat element raises the dry-bulb ambient air temperature of the oven and can be independently controlled to create the desired differential in wet-bulb and dry-bulb temperature. Further, the radiant heat element aids in aesthetic finishing of the food, for example, by creating a typically desired browned, or crispy surface of the food.

In this embodiment, the cooking chamber (12) further includes a wet-bulb temperature probe (not shown) that may be inserted into the food that is being cooked. The wet-bulb temperature probe and the dry-bulb temperature probe continuously sense the wet-bulb and dry-bulb differential to ensure the oven is maintaining the preselected temperature. The temperatures sensed are then relayed to the corresponding wet-bulb and dry-bulb PLDs for readjustment by a series of thermostatic controllers that monitor and alter the inputs to the respective heater circuits. Further, to aid in cooking more than one food at a time, the cooking chamber includes removable racks, which hold the food, are horizontally secured into rack slots (54) within the cooking chamber. The oven (10) may also include a fan (50), such as a convection fan, to ensure the temperature-controlled water vapor and the compressed air reach all surfaces of the food and to mix the water vapor and ambient air.

Figure 4:
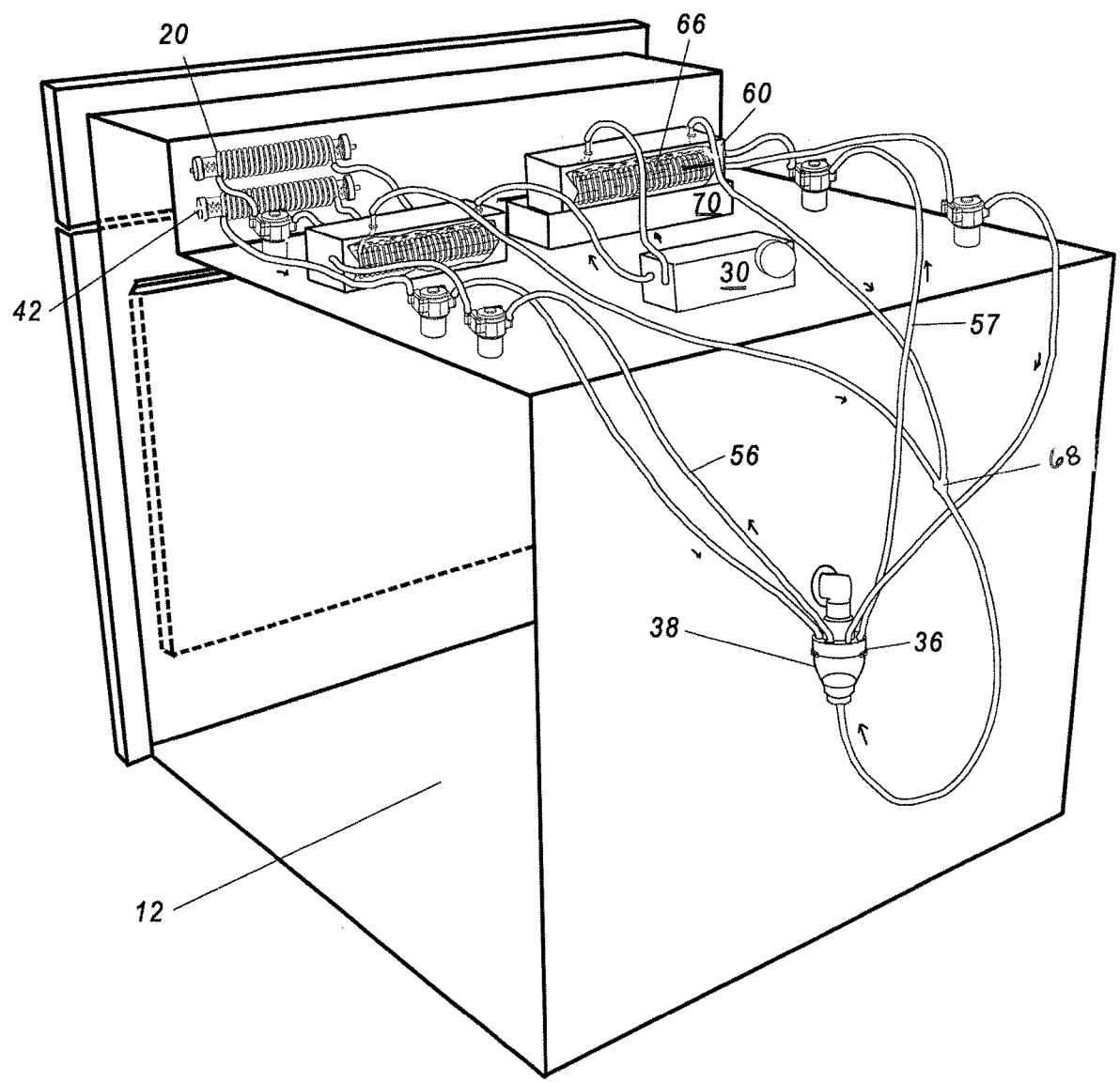
FIG. 4 shows a third embodiment of the oven of FIG. 2 for cooking using nebulized water particles and compressed air with a chilled air and water component.
Figure 5:
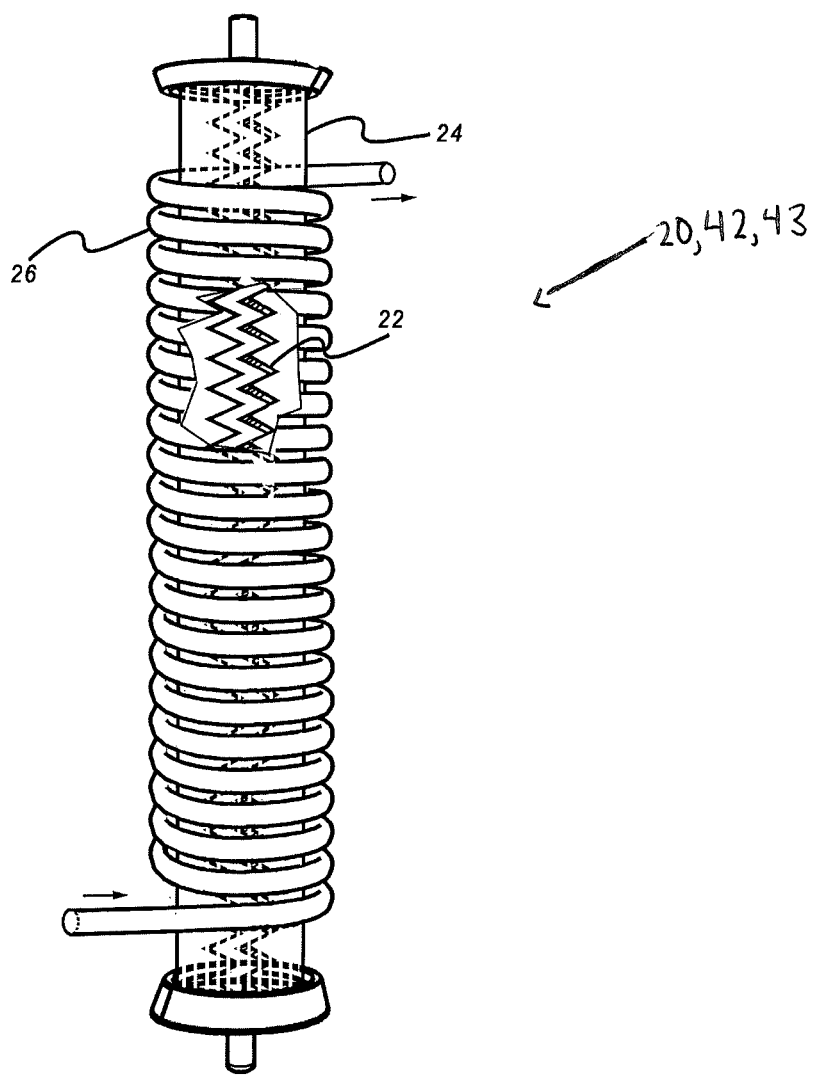
FIG. 5 is a front view of the water heater coil in accordance with the oven of FIG. 2.

In a third embodiment, as shown in FIG. 4, the oven (10) includes a chilling or refrigeration element, wherein either independently, or in addition to heated air and heated water being pumped to the nebulizer (36), chilled air and water is delivered to the nebulizer. In this embodiment, the air is piped through the air heater coil, but other embodiments include alternative means of transferring the air, such as a pump.

In this third embodiment, as shown in FIG. 4, there is a chilled reservoir (60) that is located outside a cooking chamber (12) of the oven (10). This chilled reservoir contains water that is pumped into the chilled reservoir at a set temperature, for instance from a cold-water tank. If the water is manually inserted or pumped from a municipal water source into the chilled reservoir, a Peltier thermoelectric block (70) is located underneath the chilled reservoir. For the refrigeration embodiment, in order to meet USDA food safety guidelines, the water temperature of the chilled water would be less than about forty degrees Fahrenheit, but the temperature of the chilled water can be any temperature necessary. The chilled water temperature ranges from about 30 degrees Fahrenheit and 50 degrees Fahrenheit. For example, the Peltier plate block could be set at a specific controllable temperature that cools the chilling water to 35° F. and introduce nebulized water at that temperature. This desired end point temperature is determined by a user of the oven when he manually enters the desired end point temperature or selects a predetermined cooking program. Present within the chilled reservoir of water is a temperature probe (not shown) that senses the temperature of the water within the chilled reservoir and relays this temperature data to a PLD, which fine-tunes the temperature of the water within the chilled reservoir by controlling the temperature of the Peltier block. The chilled reservoir contains an air chilling coil (66), such as coiled copper coil, that is submerged within the chilled water of the chilled reservoir. The air chilling coil retains the temperature of the water within the chilled reservoir so that the air that is pumped through the air chilling coil is set at the desired end temperature. The air can be pumped either from the same compressor (30) that is used for the air heater coil (32) or it can be from a separate compressor.

Once the water within the chilled reservoir (60) is at the desired end temperature, the chilled water and the chilled air are pumped to the nebulizer (36), as shown in FIG. 4. In this embodiment, the chilled air and chilled water are pumped to the same nebulizer as the heated air and heated water.

Accordingly, the nebulizer nebulizes the heated water and chilled water into heated and chilled water particles. These heated and chilled water particles are introduced into the cooking chamber (12) via the heated and chilled air. In this embodiment, there are separate air lines from the heated air coil and the chilled air coil, both of which join at a y-split (68). The y-split is advantageous as it aids in the mixture of the air temperatures before reaching the nebulizer. In this embodiment, the nebulizer includes a recirculation line (56) to recirculate water back to the heated water reservoir (14) or chilled water reservoir depending upon which circuit is being utilized by that specific nebulizer. Alternatively, the recirculation line includes a third water heater coil (not shown) that heats the mixed chilled and heated water back to the desired end point temperature before recirculating through the reservoir of heated water. In addition, there is a chilled water recirculation line (57), which recirculates excess water back to the chilled water reservoir (60).

In an additional embodiment, the chilled water is delivered to a separate nebulizer than the heated water and heated compressed air (not shown). The nebulizer uses standard nebulizing techniques to nebulize the chilled water into chilled water particles. These chilled water particles are introduced into the cooking chamber (12) via the chilled compressed air. In this embodiment, the nebulizer contains a float switch (not shown) that detects the water level within the nebulizer. If the water level rises above a predetermined level, the float switch activates a suction line that draws out the excess chilled water and recirculates this chilled water back to the chilled reservoir for recirculation throughout the oven (10).

Figure 7:
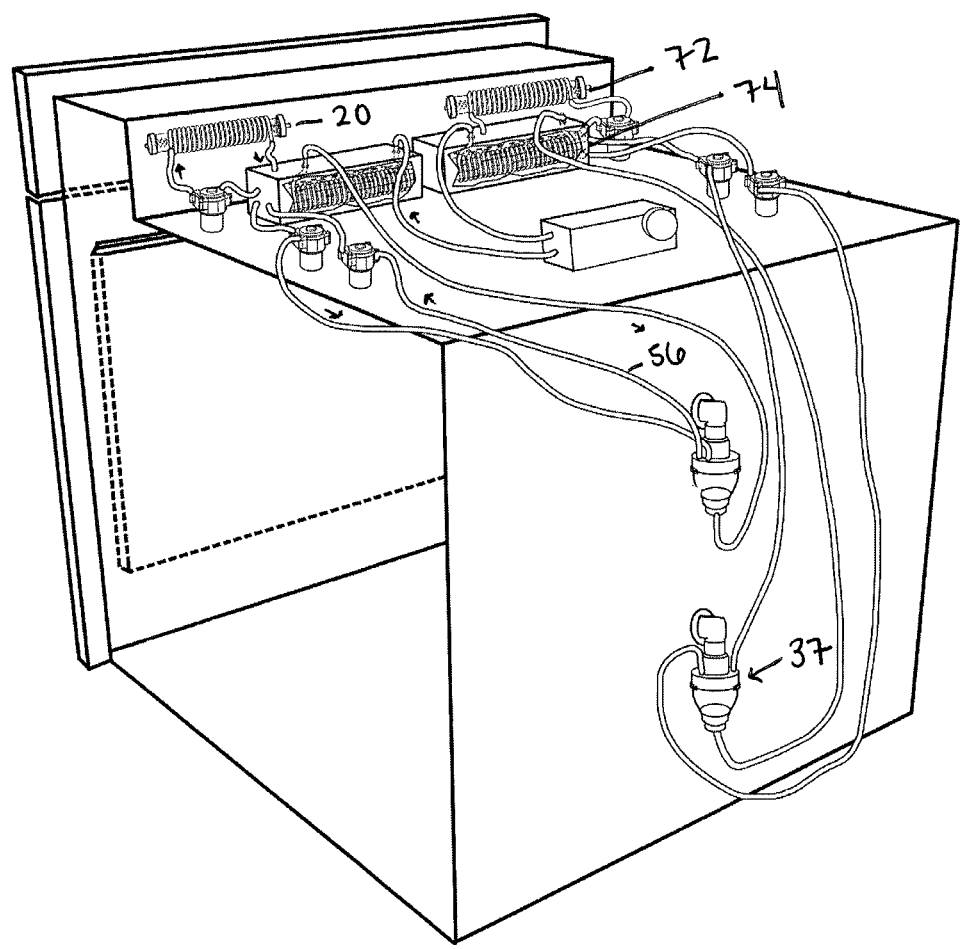
FIG. 7 is a back, perspective view of a fourth embodiment of the oven of FIG. 2.
Figure 8:
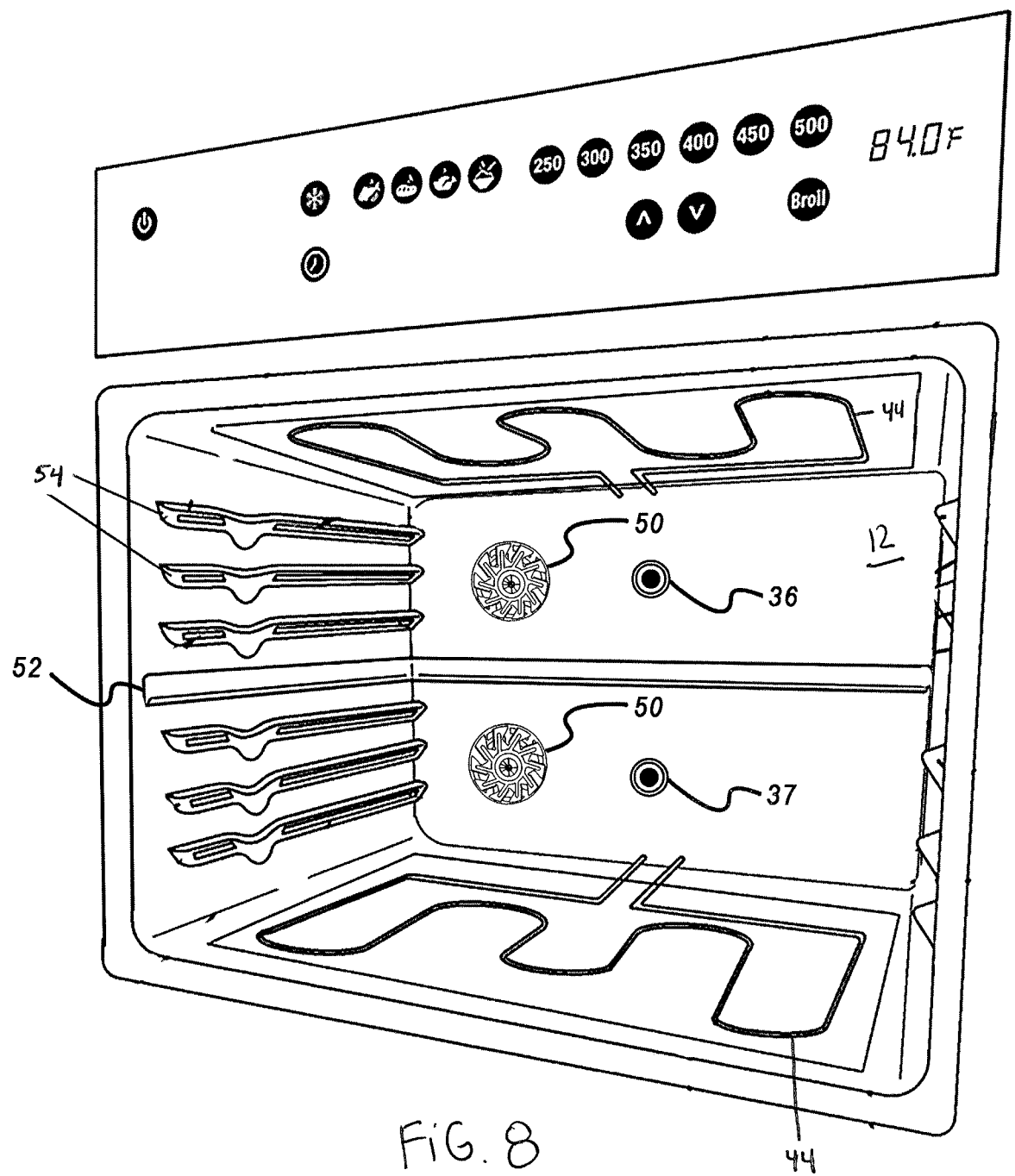
FIG. 8 is an open front perspective view of the fourth embodiment of the oven of FIG. 2.
Figure 9:
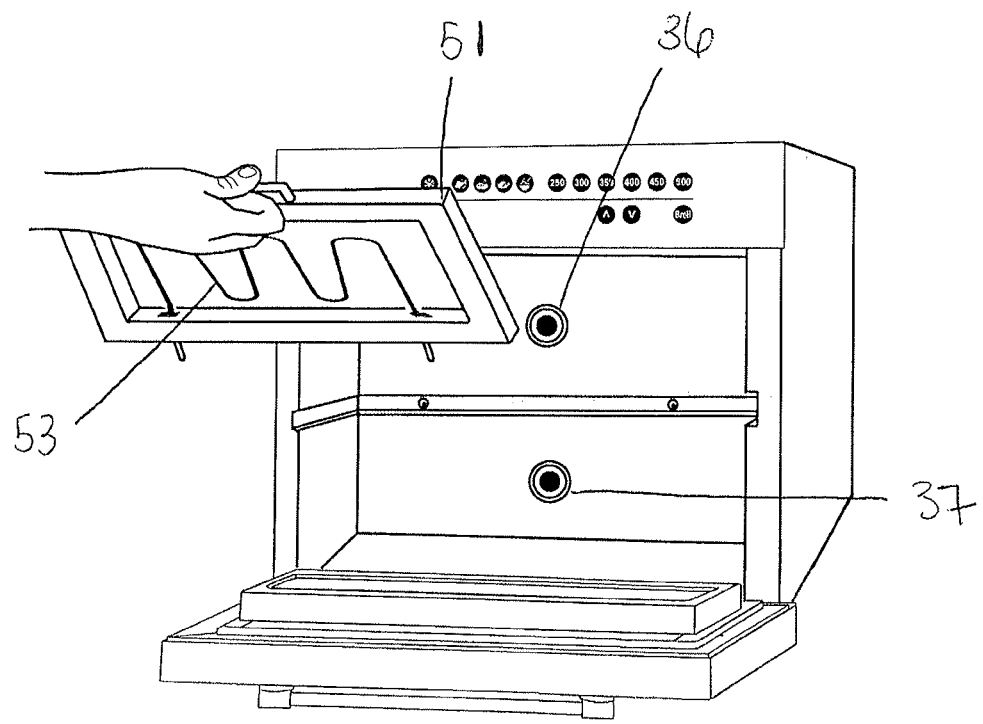
FIG. 9 is an open front perspective view of the fourth embodiment of the oven of FIG. 2.

In an fourth embodiment, as shown in FIGS. 7 and 8, more than one nebulizer may be present on the backside of the cooking chamber (12) to aid in split level cooking. In this embodiment, the cooking chamber has numerous different compartments of varying sizes that are independently controlled and monitored. Advantageously, the size of the nebulizers (36, 37) is so small and compact, that more than one nebulizer can be secured to the oven (10). Accordingly, each nebulizer, whether receiving only heated water and heated air, chilled water and chilled air, or both heated and chilled water and heated and chilled air, independently disperses the respective water particles into the independent cooking chambers. This is advantageous if the user is cooking multiple different foods that require separate cooking temperatures and times. For example, in an additional embodiment for split level cooking, as shown in FIGS. 8 and 9, the user slides a dividing plate (51) into dividing slot (52) in the cooking chamber (12) of the oven (10). As shown in FIG. 9, the dividing plate may be equipped with its own radiant heat element (53), dry-bulb temperature sensor (not shown), a condenser circuit (not shown) and wet-bulb temperature sensor (not shown). The dividing plate is fitted with appropriate gasket material on all sides of the plate, allowing the new, sub-divided chamber created by the plate to contain its own environment separate from the other areas of the oven. The connections for the wet and dry-bulb temperature sensors are provided by contacts in the rear of the plate, which connect as the plate is secured into position. This provides the user with multiple spaces within the oven to cook different foods to separate controllable temperatures and outcomes. For example, a turkey can be cooked to the 165-degree Fahrenheit end point temperature while a dish containing mashed potatoes and another dish containing a casserole may be cooked to a desired end-point temperature of 135 degrees Fahrenheit. The oven in this divided state can hold these dishes indefinitely at 135 degrees and not over-cook those items while the turkey in the other divided cavity can be cooked and held at 165 degrees.

Figure 10:
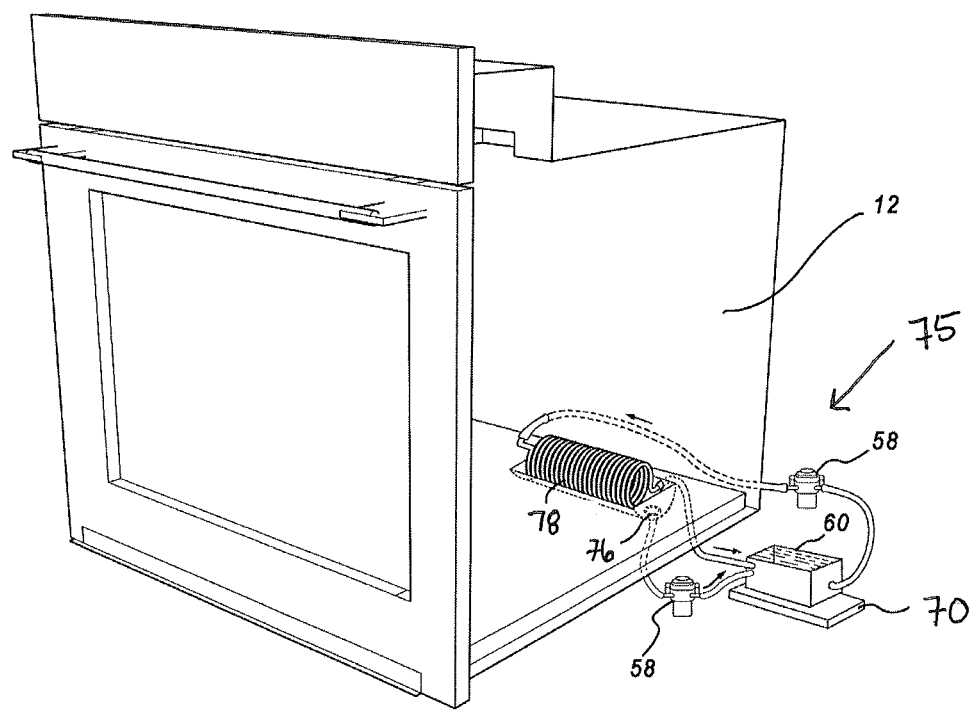
FIG. 10 is an open side perspective view of a fifth embodiment of the oven of FIG. 2.

In a fifth embodiment, as shown in FIG. 10, the oven further includes an air condenser circuit (75) including a trough (77) located at a bottom of the cooking chamber, wherein the trough includes a condenser coil (78) and a drain (76), wherein both ends of the condenser coil are connected to a second reservoir of chilled water. For example, one embodiment of the condenser circuit may utilize the same chilled water reservoir (60) that is chilled by a Peltier plate block (70), while another embodiment may use a separate chilled water reservoir (not shown). In this fifth embodiment, chilled water is pumped through the air condenser coil, which is preferably a coil of metal tubing made of copper, which is mounted on the floor at the rear of the cooking chamber. The condenser coil is located in a recessed trough in the floor of the cooking chamber. The trough has a drain hole at one end of it and may be angled down toward the drain hole to facilitate drainage toward the drain hole. As the chilled water is pumped through the copper condenser coil, the warmer nebulized air in the cooking chamber (12) is rapidly condensed by the cooler surface of condenser coil. The water that condenses on the surface of the coil collects and drips into the drain in the trough where it is pumped back through the chilled reservoir of water. In this embodiment, the previous nebulized water vapor heated to a certain temperature is quickly and efficiently removed from the cooking chamber and nebulized water vapor at a different temperature may immediately be introduced in to the cooking chamber.

It is well recognized by persons skilled in the art that alternative embodiments to those disclosed herein, which are foreseeable alternatives, are also covered by this disclosure. The foregoing disclosure is not intended to be construed to limit the embodiments or otherwise to exclude such other embodiments, adaptations, variations, modifications and equivalent arrangements.

LISTING OF ELEMENTS

Oven 10
Cooking chamber 12
Reservoir of water 14
Reservoir temperature probe (not shown)
Reservoir float switch (not shown)
First water heater coil 20
Resistance wire 22
Glass ceramic tubing 24
Coiled copper tubing 26
Air compressor 30
Air heater coil 32
Copper coil 34
Nebulizer 36
Second nebulizer 37
Feed bowl 38
Nebulizer Temperature Probe 39
Float Switch 40
Second water heater coil 42
Third water heater coil 4 (not shown)
Radiant heat element 44
Dry bulb temperature probe (not shown)
Wet bulb temperature probe (not shown)
Fan 50
Dividing plate 51
Dividing slots 52
Radiant heat element 53
Rack slots 54

Recirculation line 56
Chilled water recirculation line 57
Water pumps 58
Chilled water reservoir 60
Chilled water reservoir float switch (not shown)
Chilled water reservoir temperature probe (not shown)
Chilled air coil 66
Y-Split 68
Peltier Block 70
Fourth water heater 72
Second air heater coil 74
Condenser circuit 75
Drain 76
Condenser coil 78
Trough 77

The invention claimed is:

1. An oven, wherein the oven comprises:
a cooking chamber located within the oven;
a nebulizer attached to the cooking chamber;
a reservoir of water located outside of the cooking chamber, wherein the reservoir of water comprises an air heater submerged within the water of the reservoir, wherein the air heater comprises a first end that connects to an air compressor and a second end that connects to the nebulizer;
a water heater comprising a first and second ends thereof, wherein the first and second ends of the first water heater are submerged within the water of the reservoir; and
a pipeline, wherein one end of the pipeline is submerged within the water of the reservoir and an opposite end of the pipeline connects to the nebulizer.

2. The oven of claim 1, wherein the first water heater comprises a copper wire that passes through glass ceramic tubing, which copper wire and glass ceramic tubing are surrounded by a coiled copper tubing.

3. The oven of claim 1, further comprising a second water heater located in the pipeline between the reservoir and nebulizer.

4. The oven of claim 1, wherein the air heater comprises a copper coil.

5. The oven of claim 1, further comprising a recirculation line from the nebulizer to the reservoir.

6. The oven of claim 1, further comprising a second nebulizer attached to a divided compartment of the cooking chamber of the oven.

7. The oven of claim 1, further comprising a second reservoir of water located outside of the cooking chamber, wherein the second reservoir comprises an air cooler submerged within the water of the second reservoir, wherein the air cooler comprises a first and second end, wherein the first end of the air cooler connects to the air compressor and the second end of the air cooler connects to the nebulizer, and a second pipeline comprising a pump, wherein one end of the second pipeline is submerged within the water of the second reservoir and an opposite end connects to the nebulizer.

8. The oven of claim 7, further comprising a recirculation line from the nebulizer to the second reservoir.

9. The oven of claim 7, wherein the second reservoir is positioned on top of a Peltier block.

10. The oven of claim 1, further comprising an air condenser circuit comprising a trough located at a bottom of the cooking chamber, wherein the trough comprises a condenser coil and a drain, wherein both ends of the condenser coil are connected to a second reservoir of chilled water.

11. A process of heating an oven, wherein the method comprises:
heating water that is contained in a reservoir located outside of a cooking chamber of the oven to reach a desired end point temperature that is less than boiling;
heating compressed air through an air heater that is submerged within the water of the reservoir;
conveying the heated water and the heated compressed air to a nebulizer;
nebulizing the heated water into heated water particles; and
introducing the heated water particles into the cooking chamber via the heated compressed air.

12. The method of claim 11, wherein the water contained in the reservoir is heated by transferring water within the reservoir through a water heater coil.

13. The method of claim 11, further comprising transferring the heated water from the reservoir through a second water heater coil before conveying the heated water to the nebulizer.

14. The method of claim 11, further comprising recirculating excess heated water from the nebulizer to the reservoir.

15. The method of claim 11, further comprising conveying the heated water and the heated compressed air to a second nebulizer;
nebulizing the heated water into heated water particles; and
introducing the heated water particles into a divided compartment of the cooking chamber via the heated compressed air.

16. The method of claim 15, further comprising:
heating water contained in a second reservoir that is located outside of the cooking chamber of the oven to reach a desired end point temperature that is less than boiling;
heating compressed air through an air heater that is submerged within the water of the second reservoir;
conveying the heated water and the heated compressed air to the nebulizer;
nebulizing the heated water into heated water particles; and
introducing the heated water particles into the cooking chamber via the heated compressed air.

17. The method of claim 16, further comprising conveying the heated and chilled water and heated and chilled air to a second nebulizer;
nebulizing the heated and chilled water into heated and chilled water particles; and
introducing the heated and chilled water particles into a divided compartment of the cooking chamber via the heated and chilled compressed air.

18. A process of chilling an oven, wherein the method comprises:
chilling water contained in a reservoir that is located outside of a cooking chamber of the oven to reach a desired end point temperature that is between about 30 degrees Fahrenheit and 50 degrees Fahrenheit;
chilling compressed air through an air chiller that is submerged within the water of the reservoir;
conveying the chilled water and the chilled compressed air to a nebulizer;
nebulizing the chilled water into chilled water particles; and
introducing the chilled water particles into the cooking chamber via the chilled compressed air.

19. The method of claim 18, wherein the water contained in the reservoir is chilled by controlling a temperature of a Peltier block located underneath the reservoir.

20. The method of claim 18, further comprising conveying the chilled water and the chilled compressed air to a second nebulizer;
- nebulizing the chilled water into chilled water particles; and
- introducing the chilled water particles into a divided compartment of the cooking chamber via the chilled compressed air.

\* \* \* \* \*

UNITED STATES PATENT AND TRADEMARK OFFICE
CERTIFICATE OF CORRECTION

PATENT NO. : 10,966,432 B2  
APPLICATION NO. : 16/367854  
DATED : April 6, 2021  
INVENTOR(S) : Robert Hoerter Page 1 of 1

It is certified that error appears in the above-identified patent and that said Letters Patent is hereby corrected as shown below:

In the Claims

Column 10, Line 33:  
Claim 16, that portion of the claim reading "of claim 15" should read --of claim 16-- and claim "16" should be renumbered as claim --19--.

Column 10, Line 46:  
Claim 17, that portion of the claim reading "of claim 16" should read --of claim 19-- and claim "17" should be renumbered as claim --20--.

Column 10, Line 54:  
Claim 18, claim "18" should be renumbered as claim --16--.

Column 11, Line 1:  
Claim 19, that portion of the claim reading "of claim 18" should read --of claim 16-- and claim "19" should be renumbered as claim --17--.

Column 11, Line 4:  
Claim 20, that portion of the claim reading "of claim 18" should read --of claim 16-- and claim "20" should be renumbered as claim --18--.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*